May 12, 1964 W. S. COREY 3,132,881
TAPPING SLEEVES
Filed July 11, 1960
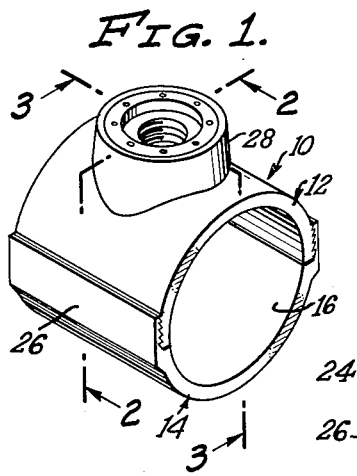
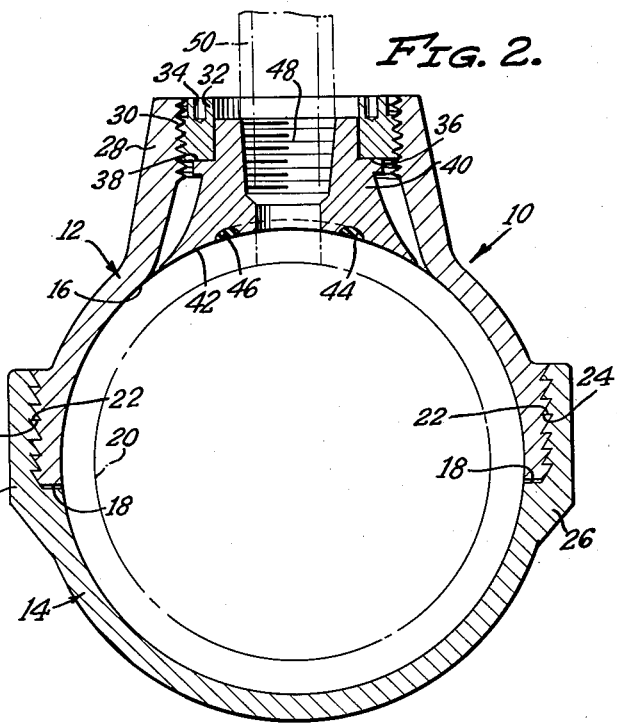
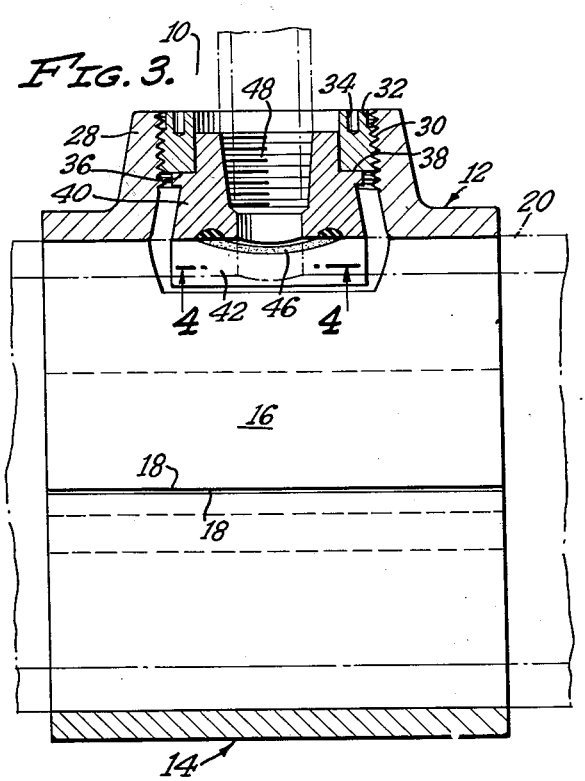
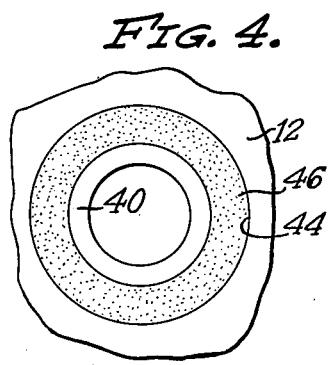
INVENTOR.
WILLIAM S. COREY
BY
ATTORNEY

United States Patent Office 3,132,881
Patented May 12, 1964

3,132,881
TAPPING SLEEVES
William S. Corey, 10236 Mount Gleason, Tujunga, Calif.
Filed July 11, 1960, Ser. No. 42,148
2 Claims. (Cl. 285—197)

This invention pertains to new and improved tapping sleeves.

Tapping sleeves are commonly used in plumbing and in other fields wherever it is desired to attach a lateral pipe to another pipe such as is commonly referred to as a main pipe. A great many types of tapping sleeves have been developed in the past. Most of these different prior structures have been used and have been capable of serving the desired function of aiding in holding a lateral pipe with respect to a main pipe.

In spite of the fact that a number of different tapping sleeves are presently known there is a definite need in this field for new and improved structures. This need arises out of a number of different factors or considerations. At the present time it is desired to have tapping sleeves which are relatively simple and inexpensive to use. This is because the cost of labor is becoming more and more important at the present time. It is also desired at the present time to have tapping sleeves which are comparatively light in weight so that they may be shipped at comparatively nominal freight costs. A new tapping sleeve to be acceptable for virtually all purposes must further be of an inert character so that corrosion problems do not arise when it is used with various different types of metal pipes or the like. Also, a tapping sleeve to be acceptable at the present time must be capable of being easily and conveniently manufactured at a comparatively nominal cost.

A broad object of the present invention is to provide tapping sleeves which constitute a decided improvement over prior related structures. A related broad object of this invention is to provide tapping sleeves meeting the various requirements for present day acceptability broadly indicated in the preceding. Thus, objectives of the present invention are to provide tapping sleeves which may be manufactured at a comparatively nominal cost, which may be easily and conveniently used by even comparatively unskilled labor, which are both easy and convenient to use, and which are immune to the effects of normally encountered corrosive influences.

These and other objects of the present invention will be more fully apparent to those skilled in the art to which the invention pertains from a detailed consideration of the remainder of this description, including the appended claims and the accompanying drawing in which:

FIG. 1 is a perspective view of an assembled tapping sleeve of this invention;

FIG. 2 is a cross-sectional view taken at line 2—2 of FIG. 1;

FIG. 3 is a cross-sectional view taken at line 3—3 of FIG. 1; and

FIG. 4 is a cross-sectional view taken at line 4—4 of FIG. 3.

The accompanying drawing is primarily intended so as to clearly illustrate a presently preferred form or embodiment of this invention. Those skilled in the art will realize that the various features of the illustrated tapping sleeve may be embodied within other differently appearing tapping sleeves through the exercise of routine engineering skill. For this reason the accompanying drawing is not to be taken as limiting this invention in any respect.

As an aid to understanding this invention it can be stated in essentially summary form that it concerns tapping sleeves, each of which includes first and second members, each of which members is formed so as to include a semi-cylindrical inner surface. Means are provided upon edges of these members for securing them together. Further, upon at least the first of these members there is provided a hollow, generally cylindrical boss which holds a sleeve. This boss carries a hollow cap having a generally ring-like shape which serves to hold the sleeve against a pipe during the use of a tapping sleeve as herein described. Preferably this sleeve is formed so as to include a groove carrying an O-ring which is adapted to form a seal against such a pipe.

The actual details of this invention are best more fully explained by referring directly to the accompanying drawing in which there is shown a tapping sleeve 10. This sleeve includes first and second members 12 and 14, respectively, each of which is formed so as to include a hollow cylindrical internal surface 16. These surfaces, as noted in the drawing, extend between ends of the members 12 and 14. During the use of the sleeve 10 the members 12 and 14 are located so that parallel edges 18 of the surface 16 are held against one another as indicated in FIG. 2 of the drawing. In this position the members 12 and 14 define a complete cylindrical cavity between which is adapted to surround a pipe 20 indicated in phantom in the drawing.

The members 12 and 14 are held in this manner through the use of what may be termed "holding means" formed adjacent to the edges 18. These holding means are not separately identified in the drawings, but consist of a series of notches 22 formed on the member 12 parallel to the edges 18 and a series of correspondingly shaped projections 24 formed on side extensions 26 of the second member 14. It is noted that these notches 22 and the projections 24 are shaped in a ratchet-like manner so that the members 12 and 14 may be secured together by merely pushing these members toward one another when these members are formed of materials permitting this method of assembly. During such pushing the extensions 26 tend to bow out slightly so as to permit movement of the projections 24 along the notches 22. The parts 12 and 14 are normally assembled in this manner when they are located with respect to a pipe, such as the pipe 20.

The first member 12 includes a hollow cylindrical boss 28 extending therefrom. This boss 28 is preferably located midway between the edges 18 of the first member and midway between the ends of this first member. It is provided with interior threads 30 which are adapted to mate with corresponding threads 30 upon a ring-like cylinder or cap 32. This cap 32 preferably has a plurality of holes 34 located in one of its ends so as to facilitate its being turned with respect to the boss 28 through the use of a conventional spanner type wrench. The cap 32 also includes an end 36 which is adapted to fit against a shoulder 38 formed upon the outside of a sleeve 40.

This sleeve 40 is of a cylindrical shape, and extends into the interior of the cap 32 past the end 36 when the sleeve 10 is assembled. The sleeve 40 includes an end 42 of a cylindrical shape corresponding to the shape of the inner surface 16 of the members 12 and 14. Around this end 42 of the sleeve 40 there is formed a groove 44 adapted to contain a conventional elastomeric O-ring 46 or equivalent sealing member. The interior of the sleeve 40 is provided with tapping threads 48 leading to the first member 12 so that a lateral pipe 50 may be threaded within it with a minimum of difficulty.

In utilizing the sleeve 10 the members 12 and 14 are placed around a main pipe, such as the pipe 20 as previously described. The sleeve 40 and the O-ring 46 are then located within the boss 28. Next the cap 32 is attached to this boss 28 and turned so as to deform the O-ring 46 as indicated in FIGS. 2 and 3 of the drawing in order to form a seal completely surrounding the interior of the sleeve 40. An appropriate opening (not shown) may then be cut into the main pipe 20, and a lateral pipe 50 as indicated in phantom in FIG. 2 may be secured into this sleeve 40 so as to be in communication with the interior of the pipe 20.

It is possible to form the various individual parts of the sleeve 10, except of course for the O-ring 46, out of a wide variety of different materials. Thus, cast iron can be used in facing the topping sleeve 10. It is possible to form at least the parts 12 and 14, and preferably also the cap 32 and the sleeve 40 out of a noncorrosive material, generally a very strong, resilient and non-metallic material. A present preferred material for this use is a polymer of highly purified formaldehyde; other materials of a similar nature of course may be used. Materials of this general type are not only non-corrosive, they are comparatively light in weight and, hence, they may be shipped at a comparatively nominal cost. Materials of this sort are also comparatively simple to form into a desired shape using modern plastic techniques. A feature of the present invention lies in the discovery that such resiliet resinous materials as polyformaldehyde are suitable for use in tapping sleeves as herein described.

An important feature of the present invention which makes it particularly acceptable for use with polymeric materials as indicated in the preceding paragraph is the manner in which the tapping sleeve 10 is formed so that the forces involved in the use of the sleeve are effectively created and applied. This is relatively difficult to understand without referring to the accompanying drawing. In using the tapper sleeve 10 as this sleeve is viewed in FIG. 2 the sleeve 40 forces the O-ring 46 against the pipe 20 so as to form a seal. This seal is of a comparatively localized, or small area.

The forces employed to hold the sleeve 40 in place are applied from the cap 32, and are transmitted from this cap to the boss 28 and thence through the holding means described on the parts 12 and 14 and are exerted in the part 14 on the pipe 20 remote from the boss 28. With the structure shown the comparatively localized, concentrated forces creating a seal at the O-ring 46 are transmitted to the first member 12 through the threads 30. These threads are, of course, capable of transmitting force without difficulty. The forces between the members 12 and 14 are with this construction of the same magnitude as the force used in forming a seal, but the forces between the members 12 and 14 are not concentrated. Instead they are spread out over the entire lengths of the members 12 and 14 and are transmitted between these members through the holding means described.

As a consequence of this the holding means described need not be capable of transmitting a great amount of force per unit length. Thus with the sleeve 10 the length of this sleeve may be varied in accordance with routine engineering skill so that the holding forces between the members 12 and 14 may be of a necessary magnitude so as to form a seal with the O-ring 46, even if the materials from which the means holding these members are formed are not as strong as more conventional materials of construction such as wrought iron. As a consequence of this it is possible to form the members 12 and 14 out of polymeric materials as described which are sufficiently resilient so as to permit the holding means indicated to be snapped together in the manner discussed in the preceding. This can be accomplished with the present invention without detracting from the ability of these holding means to perform satisfactorily.

Because of the nature of this invention it is to be considered as being limited only by the appended claims forming a part of this disclosure.

I claim:

1. A tapping sleeve which includes: a first member formed out of a resilient polymeric material, said first member including a semi-cylindrical surface having edges; a second member formed out of a resilient polymeric material, said second member including a semi-cylindrical surface having edges; coacting ratchet means formed on said members as an integral part thereof adjacent to said edges, said ratchet means being capable of securing said edges to one another so as to define a cylindrical passage between said members; boss means formed on said first member so as to lead from said passage, said boss means being located between the ends of said first member and between said edges of said first member, the extremity of said boss means remote from said first member being threaded; cap means positioned upon said boss means, said cap means being threaded upon said threads of said boss means, said cap means including an end extending within said boss means, said cap means being of a ring-like shape; sleeve means slidably mounted within said boss means, said sleeve means including a shoulder engaged by said end of said cap means, said sleeve means being of a cylindrical shape and including an end located within said first member having a cylindrical shape corresponding to the shape of said cylindrical surface of said first member, said end of said sleeve being formed so as to include a groove extending around the interior of said sleeve means the end of said sleeve remote from said cylindrical end being internally threaded; and an elastomeric O-ring sealing means located within said groove so as to extend therefrom, said sealing means being capable of forming a seal around the interior of said sleeve means when in contact with a pipe extending through said passage.

2. A tapping sleeve as defined in calim 1 wherein said members are formed of a polyformaldehyde polymer.

References Cited in the file of this patent

UNITED STATES PATENTS

| 45,964 | Ball | Jan. 24, 1865 |
| 635,534 | Florin | Oct. 24, 1899 |
| 896,200 | Dossert | Aug. 18, 1908 |
| 2,660,192 | Hunter | Nov. 24, 1953 |
| 2,660,200 | Corey | Nov. 24, 1953 |
| 2,669,466 | Cloete | Feb. 16, 1954 |
| 2,703,721 | Montgomery | Mar. 8, 1955 |
| 2,766,518 | Costanzo | Oct. 16, 1956 |
| 2,941,027 | Svec | June 14, 1960 |
| 2,956,820 | De Cenzo | Oct. 18, 1960 |
| 2,985,469 | Bowman | May 23, 1961 |
| 2,999,515 | Watson | Sept. 12, 1961 |

FOREIGN PATENTS

| 563,414 | Canada | Sept. 16, 1958 |
| 1,020,750 | France | Nov. 19, 1952 |